United States Patent [19]

Gillner et al.

[11] Patent Number: 4,590,030
[45] Date of Patent: May 20, 1986

[54] PROCESS AND APPARATUS FOR PRODUCING AN OPTICALLY UNIFORM, TRANSPARENT COATING, LAYER, FILM OR SHEET FROM A MIXTURE OF COMPONENTS

[75] Inventors: Manfred Gillner, Aachen; Hans G. Friedrich, Wuerselen; Christian Grau; Richard Crumbach, both of Aachen; Heinz Scholl, Eischweiler; Christian Hiemenz, Herzogenrath, all of Fed. Rep. of Germany

[73] Assignee: Saint-Gobain Vitrage, Aubervilliers, France

[21] Appl. No.: 617,814

[22] Filed: Jun. 6, 1984

[30] Foreign Application Priority Data

Jun. 14, 1983 [FR] France ............................ 83 09839

[51] Int. Cl.[4] ...................... B29C 41/12; F16D 27/01
[52] U.S. Cl. ................................ 264/331.19; 264/236; 366/307; 366/325; 422/133; 425/204; 425/205; 464/29
[58] Field of Search ........... 264/236, 241, 259, 331.19; 521/917, 918; 464/29; 422/133; 366/307, 325; 425/205, 204

[56] References Cited

U.S. PATENT DOCUMENTS

| 2,868,518 | 1/1959 | Corby, Jr. et al. | 521/917 X |
| 3,111,389 | 11/1963 | Hansen et al. | 521/917 X |
| 4,065,234 | 12/1977 | Yoshiyuki et al. | 464/29 X |
| 4,115,040 | 9/1978 | Knorr | 464/29 X |
| 4,120,618 | 10/1978 | Klaus | 464/29 X |

FOREIGN PATENT DOCUMENTS

| 1370480 | 10/1974 | United Kingdom . |
| 1436884 | 5/1976 | United Kingdom . |
| 1562767 | 3/1980 | United Kingdom . |
| 1576394 | 10/1980 | United Kingdom . |

*Primary Examiner*—Philip Anderson
*Attorney, Agent, or Firm*—Oblon, Fisher, Spivak, McClelland & Maier

[57] ABSTRACT

A process and apparatus for producing a homogeneous and highly transparent sheet or film from a mixture of a plurality of components which comprises mixing the combined reaction components and depositing the reaction mixture on a molding substrate where the reaction is carried out in a layer thereon, wherein the combined reaction components are mixed, first, in a static mixer and, immediately thereafter, in a dynamic mixer.

The invention can be advantageously applied to the manufacture of polyurethane sheets which can be employed in laminated glass sheets.

12 Claims, 7 Drawing Figures

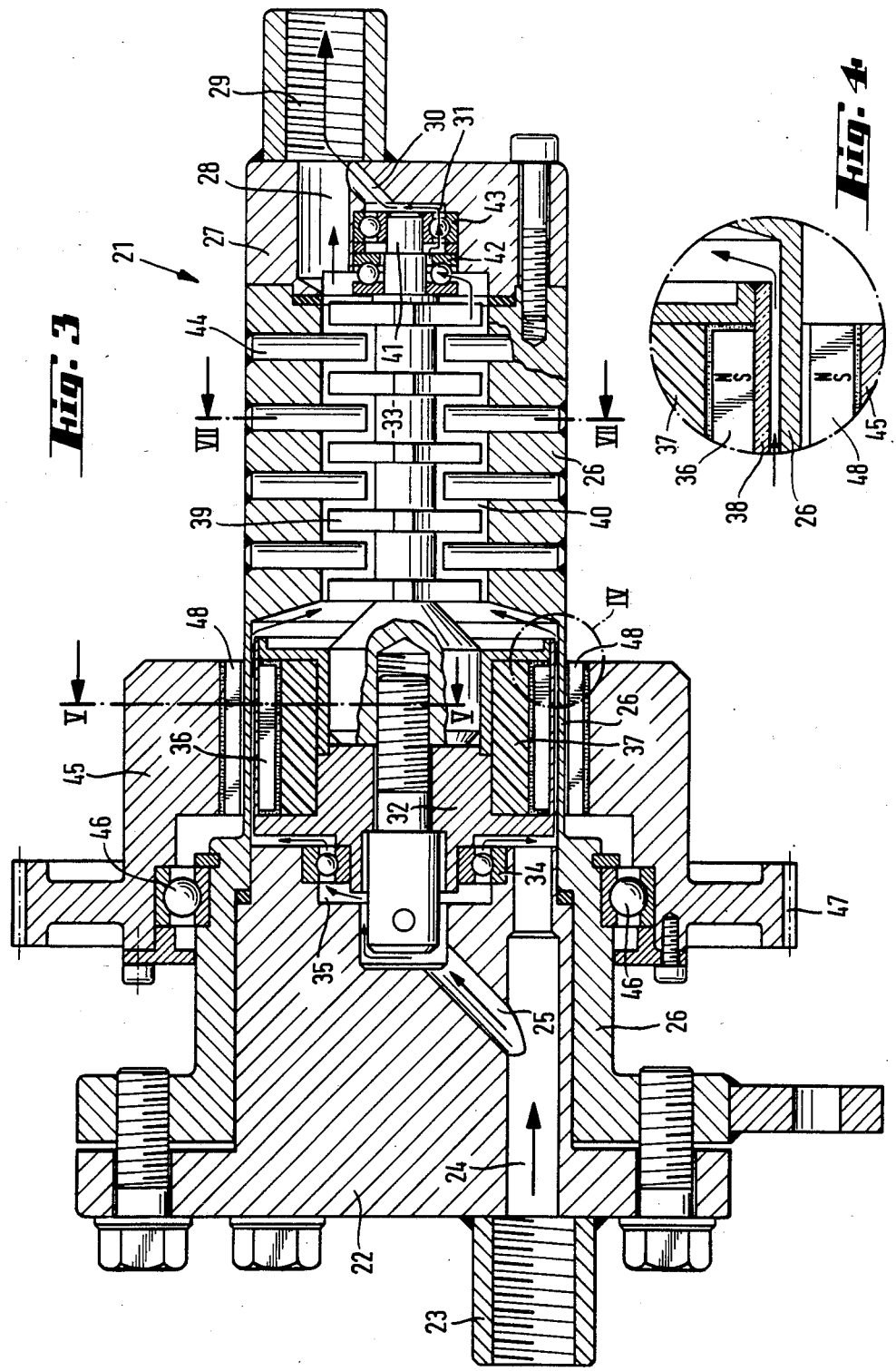

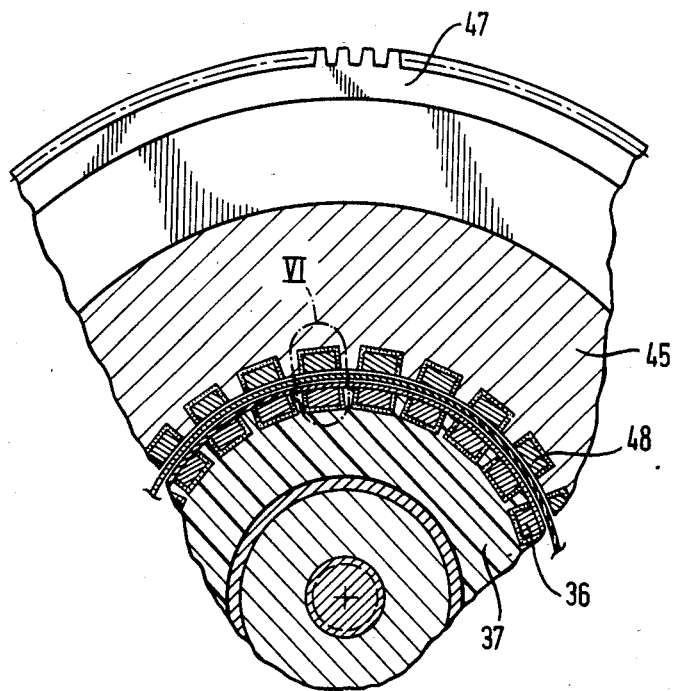
Fig. 5
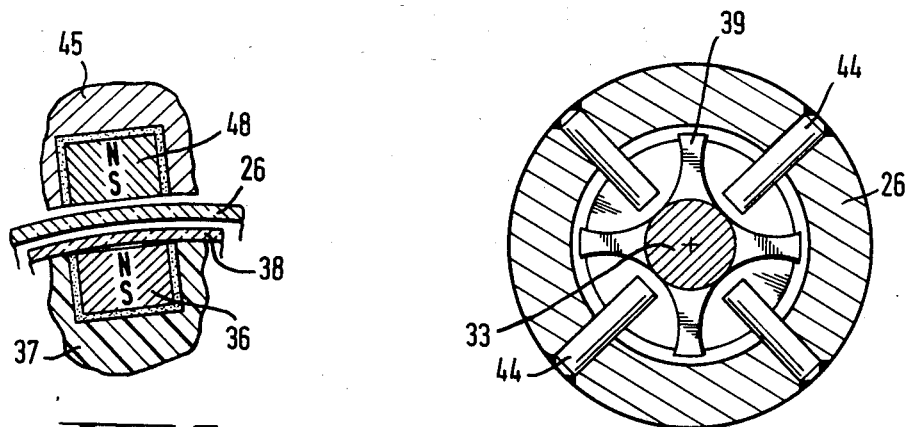
Fig. 6
Fig. 7

PROCESS AND APPARATUS FOR PRODUCING AN OPTICALLY UNIFORM, TRANSPARENT COATING, LAYER, FILM OR SHEET FROM A MIXTURE OF COMPONENTS

BACKGROUND OF THE INVENTION

1. Field of the Invention

This invention relates to a process and an apparatus for producing an optically uniform, i.e., optically homogeneous, highly transparent coating or the like from a mixture of a plurality of components which can be flow-molded and which react to form a polyurethane.

2. Description of the Prior Art

In certain cases, objects comprised of plastic material must satisfy extremely stringent specifications with regard to the uniformity of the plastic material. For example, certain coatings, films, or laminating sheets are required to be free of optical defects and distortion. Such highly transparent coatings, films, and sheets are employed, e.g., as films to protect against fragmentation, on window panes comprised of silicate glass; or as coatings to improve the abrasion resistance of plastic objects. Examples of such safety glass window panes and abrasion-resistant plastic sheets, as well as examples of production of such coatings and the like from specific polyurethane materials, are described, e.g., in Ger. OS No. 20 58 504, Ger. AS Nos. 22 28 299, and 26 29 779.

In reactive flow-molding processes of this type, employing a plurality of components, the homogeneity and thus the optical quality of the polyurethane sheet or film is basically determined by the mixing operation which immediately precedes the molding of the said coating. As soon as the reactants come into contact, the polyaddition reaction effectively begins. Since the reacted portions of the mixture have a different viscosity from that of the reaction components (i.e., the unreacted reaction mixture), striae form within the molding mass which are visible in the sheet or film when the reaction is finished. Therefore, it is important to produce a mixture of the reaction components which is as homogeneous as possible, in the shortest possible time, in order to bring about uniform reaction in the molded mass so as to avoid formation of striae. There is an additional difficulty presented in mixing the reaction components in the case of polyurethane, in that the two components, viz. the polyol and the isocyanate, have substantially different viscosities, differing, according to measurements, by a factor of 4 to 8 or more.

Therefore, a need continues to exist for a process for mixing two or more components of a system of a plurality of components, in particular components of a reaction mixture containing and/or resulting in a polyurethane molding resin, whereby in the process an optically homogenous mixture is produced in the minimum time possible following the combination of the reaction components which satisfies the stringent requirements of physical and chemical homogeneity.

SUMMARY OF THE INVENTION

Accordingly, it is an object of the present invention to provide a process for mixing two or more components of a system of a plurality of components, in particular components of a reaction mixture containing and/or resulting in a polyurethane molding resin, whereby in the process an optically homogeneous mixture is produced in the minimum time possible following the combination of the reaction components.

It is also an object of this invention to provide such a process which produces an optically homogeneous mixture which satisfies the stringent requirements of physical and chemical homogeneity.

BRIEF DESCRIPTION OF THE DRAWINGS

Other objects, features and attendant advantages of the present invention will be more fully appreciated as the same becomes better understood from the following detailed description when considered in connection with the accompanying drawings in which like reference characters designate like or corresponding parts and wherein:

FIG. 3 is a longitudinal cross section of a dynamic mixer;

FIG. 4 is a detailed view of region IV of FIG. 3;

FIG. 5 is a partial cross-sectional view of the dynamic mixer through line V—V of FIG. 3;

FIG. 6 is a detailed view of region VI of FIG. 5; and

FIG. 7 is a cross section of the mixing chamber of the dynamic mixer through line VII—VII of FIG. 3.

DETAILED DESCRIPTION OF THE PREFERRED EMBODIMENTS

Figure 1:
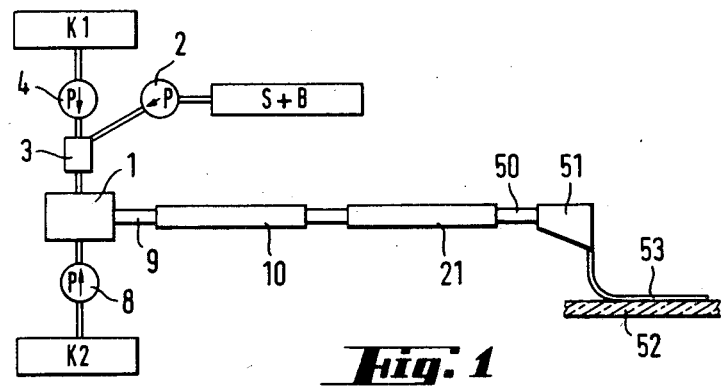
FIG. 1 is a process diagram of the process according to the invention.

According to the present invention, after the reaction components are combined, they are mixed first in a mixer operating on the basis of a static mixing principle, and then in a dynamic mixer which immediately follows the static mixer.

The inventive process yields transparent sheets or films which are free of striae and are of optimal optical quality. This result is achieved by a specific combination of two known mixing operations conducted in a specific order, which results from the finding that additional advantagers in improved mixing accrue to certain preferred arrangements of the apparatuses employed.

The present invention is based on the discovery that the use of known mixing processes does not lead to the desired result in the case of the particular problems described, and that it is impossible to produce films or the like free from optical distortion, i.e., free from striae, by known means. If, for example, one employs static mixing processes making use of various known mixers for mixing liquids in the laminar flow regime, it is found that a relatively long mixing length is needed to produce sufficient mixing of the reaction components. The reaction mixture requires a relatively long time to pass through this long mixing length. Meanwhile, the polyaddition process, already begun, continues to proceed. Further, the long mixing length aggravates differences in residence time among different localized flow paths, whereby at the downstream end of the mixing length different reaction states and conditions pertain across the entirety of the cross section. If, in place of a static mixing tube one employs a dynamic mixer, with the aim of reducing the mixing time, the result is no more satisfactory. This is due to the fact that under low mixing intensity regimes, the quality of mixing is inadequate but under high mixing intensity regimes the temperature of the reaction mixture is increased by frictional heating, whereby local fractions of the mixture are generated which are of an advanced degree of polymerization. This is very detrimental to the optical properties of the molded sheet or film. The overall acceleration of the polyaddition reaction increases the viscosity of the molding mixture (on a gross scale as well), which can be very detrimental at the stage of the molding operation, since it becomes virtually impossible to produce a uniform molded sheet or film within the mold space or volume. The abovementioned drawbacks are avoidable only by the inventive process, whereby after the reaction components are combined they pass for a distance through a static mixer which is so short that only good premixing and nothing more is achieved but it is achieved in a short time and without an increase in temperature; then the statically premixed reaction mixture is immediately fed to a dynamic mixing apparatus wherein mixing takes place to the degree of homogeneity (well-mixing) required.

As a general rule, a catalyst and possibly other adjuvants, e.g., a stabilizer to increase resistance to U.V. radiation, are added to the reaction mixture. In another advantageous embodiment of the invention, the adjuvants are uniformly mixed into one or more of the reaction components before the reaction components are combined. It has been found that this technique enables one to reliably eliminate defects in homogeneity attributable to the manner in which the adjuvants are fed.

A particularly advantageous embodiment of an apparatus suited for carrying out the inventive process comprises a dynamic mixer wherein the mixing shaft is coupled to drive means via a coupling employing permanent magnets, wherewith the reaction mixture flows between the wall of the casing of the mixer and an interior ring element of the magnetic coupling, which ring is connected to the mixing shaft, and wherewith the said interior magnetic coupling ring is driven by an exterior magnetic coupling ring disposed exterior to the casing of the mixer. A dynamic mixer of this construction has the advantage that the reaction mixture is driven in essentially plug flow through the mixer, as a consequence of the fact that the mixer is free of stagnant regions wherein portions of the reaction mixture may have longer residence times than in other regions. Another advantage is that one may increase the pressure of the reaction mixture passing through this mixer to a substantial degree without facing problems of sealing. The tolerance of increased pressures enables operation at higher flow rates, reducing the residence time of the plastic reaction mixture in the mixer, which enables one to avoid the risk of premature setting or of too great a degree of polymerization of the reaction mixture, which occurrences affect the fluidity and homogeneity of the reaction mixture of the plastic material. The reaction mixture leaving the mixer is of a completely homogeneous composition (i.e., both chemically and physically), and is thus totally free from (the susceptibility to produce) striae.

The inventive mixing process and apparatus described infra in detail are suited not only for mixing reaction resins but also obviously for mixing and homogenizing in other systems, e.g., mixing of solvents and adhesives, where the mixture must meet particularly stringent requirements relating to homogeneity. This will always be the case if the film or coating (e.g., of adhesive) must be free from striae in order to ensure freedom from optical distortion.

The stages in the process are illustrated schematically in FIG. 1. The flow-moldable polyurethane resin is produced from components K1 and K2, K1 comprising a polyether obtained by condensing epoxypropane with a triol and having a molecular weight of c. 450 and a content of free OH groups of 10.5 to 12% (by wt.) and K2 comprising a biuret of 1,6-hexanediisocyanate, having a content of free NCO groups of 21 to 22% (by wt.). The viscosity of component K1 at ambient temperature is 300 to 800 centipoise, and that of component K2 is 2,000 to 14,000 cp. To produce the flow-moldable mixture, the following additives are employed: 2,6-di-t-butyl-p-cresol in the amount of 2.3% (by wt.) (based on the amount of K1), as a stabilizer against U.V. radiation, and dibutyltin dilaurate in the amount of 0.05% (based on the amount of K1), as a catalyst. K1 and K2 are mixed together in a weight ratio of about 1:1.

Before components K1 and K2 are combined in the mixing chamber 1, a mixture of the additives (the stabilizer S and the catalyst B, in the indicated ratio) is produced, and this mixture is charged to the mixing apparatus 3 by the dosing pump 2 (shown schematically). Compnent K1 is then charged to mixing apparatus 3 by dosing pump 4. Dosing pumps 2 and 4 are provided with means such that the desired ratio of stabilizer-catalyst mixture to component K1 is maintained with precision. The mixing apparatus 3 may basically be of any type desired, and is not a critical element of the process. Static mixers of the type 10 described in detail infra, of which mixing chamber 1 is an example, have proven suitable for the mixing apparatus 3. Component K1 after mixing with the stabilizer and catalyst is fed from mixing apparatus 3 to the mixing chamber 1.

Component K2 is also fed to mixing chamber 1 in the desired ratio, by dosing pump 8.

Mixing chamber 1 serves simply to combine the reactants. The supply pipes for the two components comprise check valves (not shown) which prevent reversal of the direction of flow in the event of a pressure inversion. The outlet pipe (of mixing chamber 1) is connected to a nozzle 9 which feeds the mixed reactants into the static mixer 10.

Figure 2:
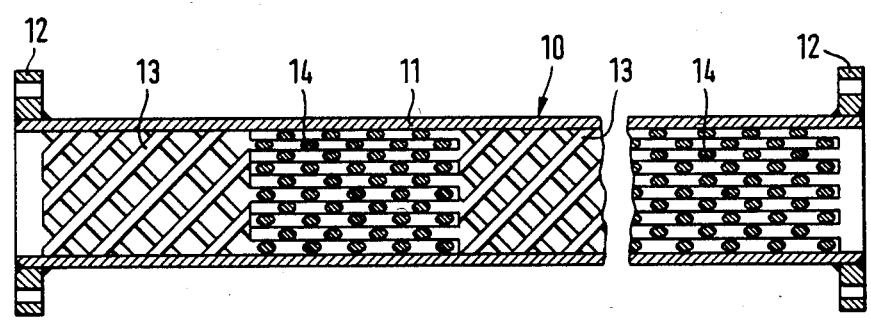
FIG. 2 is a cross section of a static mixing tube.

Static mixer 10 is illustrated in longitudinal cross section in FIG. 2. It is comprised of a pipe 11 of length 360 mm, provided with flanges 12, in which pipe the mixing elements 13 and 14 are installed, each of which is 24 mm long with diameter 12 mm (corresponding to the inner diameter of piper 11). The mixing elements comprise latch structures disposed generally transversely to the flow direction, each element shifted by a (radial) angle of 90° with respect to the preceding one. Fifteen such elements 13 and 14 in all are disposed alternatingly in the pipe 11. The laths of the mixing elements disposed transversely to the (gross) flow direction cause continuous mixing of the components which are sought to be mixed, by breaking them, i.e., "the flow", up into films and dispersing them (i.e., "the films") over the entire cross section of the pipe.

The Sulzer type SMX static mixer (supplied by Gebrueder Sulzer AG, of Switzerland) and the N-FORM mixer (supplied by Societe Bran & Luebbe, of Hamburg, W. Germany) have proven particularly suitable for this application.

Immediately after passing through the static mixer 10, the reaction mixture is fed to the dynamic mixer 21 illustrated in detail in FIGS. 3-7. FIG. 3 shows the mixer 21 with fixed forward housing piece 22 and entrance pipe 23 through which the fluid reaction mixture passes. Forward housing piece 22 is provided with a cylindrical channel 24 which is connected to entrance pipe 23. Another cylindrical channel 25 branches above channel 24 to a (radially) central chamber 35 in housing piece 22. Part of the reaction mixture passes directly through channel 25 and across the ball bearing 34 which supports the shaft 33, thus assuring continuous rinsing of the bearing and avoiding flow stagnation in the region of the bearing. The casing 26 of the mixer may be rigidly connected to the fowar housing piece 26, e.g., by machine screws. The casing 26 is terminated by a detachable end piece 27 which is provided with an axially running channel 28 and an exit pipe 29 for outflow of the fluid reaction mixture comprised of synthetic material. An inclined branch channel 30 connects the (radially) central cavity 31 to channel 28. Rotating shaft 33 is disposed in cavity 31. In the interior of casing 26 there is disposed an interior coupling ring 32 (part of the magnetic coupling described infra) which is rigidly connected to shaft 33. Said ring is rotatably mounted on ball bearing 34 in cavity 35 of housing piece 22. Permanent magnets 36 are disposed around the periphery of the interior coupling ring and are axially inserted to fit in corresponding cavities of an annular element 37. The permanent magnets 36 are covered on the outside, e.g., by a thin-walled hollow cylinder 38 (FIG. 4) comprised, e.g., of a chemically resistant synthetic material.

The mixing elements 39, which may be in particular mixing crosses, are disposed a certain distance apart on the mixing shaft 33 in the mixing chamber 40. Shaft 33 extends through the entire mixing chamber 40, and is terminated in a journal 41 rotatably mounted on bearings 42 and 43 in the end piece 27. Part of the reaction mixture leaving the mixing chamber passes through bearings 42 and 43 and channel 30 to exit pipe 29.

Fixed mixing bars 44 are mounted in the wall of casing 26 in the axial region of mixing chamber 40. The ends of these bars extend into the mixing chamber 40 between the rotating crosses 39 of shaft 33. Preferably two or four mixing bars are distributed around the periphery of casing 26 at each axial mixing-bar location (FIG. 7).

Exterior to the casing 26 at the axial level of ring 32, a coupling ring 45 is mounted, which rotates on the casing, preferably by the intermediary of a bearing 46. Ring 45 is connected via spur gear 47 to a motor (not shown) which drives said ring. Permanent magnets 48 are housed parallel in cavities interior to the annular surface of ring 45 which surface faces the casing 26, said magnets being distributed around the periphery of said surface. The permanent magnets in exterior ring 45 and in annular element 37 are disposed so that they are always oriented with opposite poles facing. Thus, if the magnets disposed in ring 45 are oriented with south poles facing interiorly, the magnets disposed in element 37 are oriented with north poles facing exteriorly (FIG. 6).

The synthetic fluid reaction mixture passes through entrance pipe 23, channel 24 in forward housing piece 22, and the annular space between interior coupling ring 32 and the wall of casing 26, into mixing chamber 40 disposed downstream of the permanent magnet coupling mechanism. At the same time, part of the reaction mixture flows through channel 25 (and space 35) and directly through ball bearing 34. The reaction mixture is subjected to fluid dynamic treatment (agitation etc.) in the mixing chamber 40, where intensive mixing takes place and stagnant zones are prevented from forming in the shaft coupling region near the bearings and in the mixing chamber itself. The reaction mixture passes out of the mixing chamber 40 through the bearings 42 and 43, and then flows through channel 28 and exit pipe 29.

The arrows (other than the arrows clearly associated with cross section lines V—V and VII—VII and unit arrow 21) indicate the flow direction. The flow direction and ratio in the region of the magnetic coupling are shown in particular in FIG. 4. (In operation, a vertical orientation of the mixer is anticipated, with exit pipe 29 at the top.)

It is seen clearly from FIG. 3 that the mixer illustrated is free of sliding seal joints which can heat up during operation and thereby cause a locally excessive rate of polymerization. The synthetic fluid reaction mixture flows quasi-linearly through the mixer without passing across stagnant regions. This feature is important in enabling production of a reaction mixture which is uniformly well-mixed.

When the reaction mixture passes out through exit pipe 29 it has optimal homogeneity. It is admitted through pipe 50 to flow-molding device 51, which may be in the form of a so-called molding head with scraper, of the type disclosed, e.g., in German Pat. No. 2,614,596. Where the reaction mixture is to be employed to produce a sheet or film, the molding substrate 52 employed is advantageously a glass sheet. The reaction mixture is applied to the molding substrate 52 in a layer of uniform thickness. After polymerization of layer 53 with appropriate (external) heating, the finished polyurethane sheet is stripped from the molding substrate 52.

Having now fully described this invention, it will be apparent to one of ordinary skill in the art that many changes and modifications can be made thereto without departing from the spirit or scope of the invention as set forth herein.

What is claimed as new and desired to be secured by Letters Patent of the United States is:

1. A process for producing a homogeneous and highly transparent sheet or film from a mixture of a plurality of components, which comprises mixing the combined reaction components and depositing said mixture on a molding substrate where the reaction is carried out in a layer thereon, wherein the combined reaction components are mixed, first, in a static mixer and, immediately thereafter, in a dynamic mixer, and wherein the combined reaction components are passed for a distance through the static mixer sufficient to achieve only a premixing and without an increase in temperature, and immediately thereafter, the statically premixed reaction mixture is fed to a dynamic mixer, wherein sufficient mixing is effected to obtain the requirement degree homogeneity.

2. The process according to claim 1, wherein said mixture of a plurality of components is a mixture of components which is flow-moldable and which undergoes reaction to yield a polyurethane.

3. The process according to claim 2, wherein said mixture further comprises a polymerization reaction catalyst and a stabilizer.

4. The process according to claim 3, wherein said catalyst and said stabilizer are uniformly mixed into one of the reaction components before the reaction components are combined.

5. The process according to claim 2, wherein said flow-moldable polyurethane resin is produced from a component comprising a polyether obtained by condensing epoxypropane with a triol and having a molecular weight of about 450 and having a content of free OH groups of 10.5 to 12% by wt; and a component comprising a biuret of 1,6-hexanediisocyanate, having a content of free NCO groups of 21 to 22% by wt.

6. The process according to claim 5, wherein said polyether component has a viscosity of about 300 to 800 centipoise at ambient temperature, and said isocyanate component has a viscosity of about 2,000 to 14,000 centipoise at ambient temperature.

7. The process according to claim 3, wherein said stabilizer is 2,6-di-t-butyl-p-cresol and said catalyst is dibutyltin dilaurate.

8. The process according to claim 5, wherein said two components are mixed together in a weight ratio of about 1:1.

9. An apparatus for producing a homogeneous and highly transparent sheet or film from a mixture of a plurality of components, which comprises:
  (a) a mixing chamber having two entrance connections for admitting the reaction components and an exit connection communicating with a static mixer;
  (b) a static mixer comprising a pipe and being connected downstream of said mixing chamber; and
  (c) a dynamic mixer disposed downstream of said static mixer; and
  (d) a flow molding device being connected to an exit of and disposed downstream of said dynamic mixer and wherein said static mixer has mixing elements which comprise a framework composed of laths which are crossed and are latticed or interwoven or a combination thereof, to form elements which are disposed in succession axially along the pipe of which said mixer is comprised, wherein each element is shifted by a radial angle of 90° with respect to the preceding one, and wherein said dynamic mixer is comprised of a casing which houses a driven mixing shaft which is furnished with mixing elements which cooperate with the other said mixing elements disposed in said casing, and wherein said mixing shaft is coupled to a drive means via a permanent magnetic coupling, wherewith the reaction mixture flows between the wall of the casing of the mixer and an interior ring element of the magnetic coupling, which ring is connected to the mixing shaft, and wherewith said interior coupling ring is driven by an exterior magnetic coupling ring disposed exterior to the casing of the mixer.

10. The apparatus according to claim 9, wherein said interior coupling ring and magnetic coupling ring have mutually facing surfaces furnished with permanent magnets which are distributed uniformly around the peripheries of said rings.

11. The apparatus according to claim 10, wherein said permanent magnets are each fitted into respective cavities in the coupling rings, and the permanent magnets of the interior coupling ring are covered in a liquid-tight fashion.

12. The apparatus according to claim 9, wherein said mixing shaft has bearings which are housed by cavities and said cavities are connected to the flow of the reaction mixture by means of channels, whereby said reaction mixture flows directly through the bearings.

* * * * *